US010099128B1

(12) United States Patent
Harrington et al.

(10) Patent No.: US 10,099,128 B1
(45) Date of Patent: *Oct. 16, 2018

(54) SYSTEM AND METHOD FOR PROVIDING RECOMMENDATIONS FOR IN-GAME EVENTS

(71) Applicant: KABAM, INC., San Francisco, CA (US)

(72) Inventors: Clifford J. Harrington, San Francisco, CA (US); Kent Wakeford, Hillsborough, CA (US)

(73) Assignee: Kabam, Inc., San Francisco, CA (US)

( * ) Notice: Subject to any disclaimer, the term of this patent is extended or adjusted under 35 U.S.C. 154(b) by 338 days.

This patent is subject to a terminal disclaimer.

(21) Appl. No.: 15/072,212

(22) Filed: Mar. 16, 2016

Related U.S. Application Data

(63) Continuation of application No. 14/107,914, filed on Dec. 16, 2013, now Pat. No. 9,295,916.

(51) Int. Cl.
*A63F 9/24* (2006.01)
*A63F 13/35* (2014.01)

(52) U.S. Cl.
CPC .................................... *A63F 13/35* (2014.09)

(58) Field of Classification Search
USPC ...................................................... 463/20–43
See application file for complete search history.

(56) References Cited

U.S. PATENT DOCUMENTS

| 5,838,907 | A | 11/1998 | Hansen |
| 6,425,822 | B1 | 7/2002 | Hayashida |
| 7,465,231 | B2 | 12/2008 | Lewin |
| 7,568,973 | B2 | 8/2009 | Iddings |
| 7,890,586 | B1 | 2/2011 | McNamara |
| 7,930,215 | B2 | 4/2011 | Pombo |
| 7,997,987 | B2 | 8/2011 | Johnson |
| 8,016,678 | B1 | 9/2011 | Hutter |
| 8,126,426 | B2 | 2/2012 | Fridman |
| 8,209,277 | B2 | 6/2012 | Kumar |
| 8,292,725 | B2 | 10/2012 | Wikander |
| 8,360,873 | B1 | 1/2013 | Wickett |
| 8,401,009 | B1 | 3/2013 | Dorsey |
| 8,423,889 | B1 | 4/2013 | Zagorie |
| 9,623,322 | B1 | 4/2017 | Wakeford |
| 2002/0112081 | A1 | 8/2002 | Armstrong |
| 2002/0132608 | A1 | 9/2002 | Shinohara |

(Continued)

FOREIGN PATENT DOCUMENTS

| WO | 2006013429 | 1/2006 |
| WO | 2008157477 | 2/2008 |

(Continued)

*Primary Examiner* — Masud Ahmed

(74) *Attorney, Agent, or Firm* — Sheppard Mullin Richter & Hampton LLP

(57) ABSTRACT

Recommendations for in-game content are provided to players of an online game. An instance of a virtual space is executed in which an online game is conducted and implemented to facilitate presentation of a view of the virtual space to users through client computing platforms associated with the users. Device specification sets of the client computing devices are determined and recommendations for in-game content are presented to the users based on the obtained device specification sets of the client computing devices associated with the users.

20 Claims, 4 Drawing Sheets

(56) References Cited

U.S. PATENT DOCUMENTS

| | | |
|---|---|---|
| 2002/0138582 A1 | 9/2002 | Chandra |
| 2002/0158917 A1 | 10/2002 | Sinclair |
| 2003/0172121 A1 | 9/2003 | Evans |
| 2005/0261062 A1* | 11/2005 | Lewin et al. .................. 463/42 |
| 2006/0015580 A1* | 1/2006 | Gabriel et al. ................ 709/219 |
| 2006/0136964 A1* | 6/2006 | Diez et al. ..................... 725/37 |
| 2007/0011256 A1 | 1/2007 | Klein |
| 2007/0219000 A1 | 9/2007 | Aida |
| 2008/0090659 A1 | 4/2008 | Aguilar |
| 2008/0176618 A1 | 7/2008 | Toompere |
| 2008/0207327 A1* | 8/2008 | Van Luchene et al. ....... 463/42 |
| 2008/0228636 A1* | 9/2008 | Gattis et al. ................... 705/39 |
| 2009/0077463 A1 | 3/2009 | Koster |
| 2009/0088249 A1 | 4/2009 | Kay |
| 2009/0170608 A1 | 7/2009 | Herrmann |
| 2010/0029386 A1 | 2/2010 | Pitsch |
| 2010/0245912 A1 | 9/2010 | Mount |
| 2010/0248822 A1 | 9/2010 | Migos |
| 2011/0022641 A1* | 1/2011 | Werth et al. .................. 707/803 |
| 2011/0082703 A1 | 4/2011 | Higbie |
| 2011/0118028 A1 | 5/2011 | Sobel |
| 2011/0145050 A1 | 6/2011 | Gross |
| 2011/0179180 A1 | 7/2011 | Schleifer |
| 2011/0237335 A1 | 9/2011 | Holloway |
| 2011/0250972 A1 | 10/2011 | Horbay |
| 2011/0276883 A1 | 11/2011 | Cabble |
| 2012/0007569 A1 | 1/2012 | Sumimoto |
| 2012/0011211 A1 | 1/2012 | Smith |
| 2012/0038550 A1 | 2/2012 | Lemmey |
| 2012/0192087 A1 | 7/2012 | Lemmey |
| 2012/0252582 A1 | 10/2012 | Hilleman |
| 2012/0265568 A1 | 10/2012 | Marshall |
| 2012/0277003 A1* | 11/2012 | Eliovits et al. ................ 463/42 |
| 2012/0311041 A1 | 12/2012 | Aonuma |
| 2012/0331058 A1* | 12/2012 | Huston et al. ................ 709/204 |
| 2013/0085886 A1 | 4/2013 | Satish |
| 2013/0086467 A1 | 4/2013 | Weber |
| 2013/0109480 A1 | 5/2013 | Yuan |
| 2013/0117105 A1 | 5/2013 | Dyor |
| 2013/0117377 A1 | 5/2013 | Miller |
| 2013/0125113 A1 | 5/2013 | Do |
| 2013/0310156 A1* | 11/2013 | Gadher et al. ................. 463/25 |
| 2014/0040760 A1* | 2/2014 | Randell et al. ............... 715/745 |
| 2014/0194208 A1 | 7/2014 | Splaine |
| 2014/0310036 A1 | 10/2014 | Grosso |
| 2014/0324965 A1* | 10/2014 | Ralston et al. ............... 709/204 |
| 2015/0011277 A1 | 1/2015 | Wakeford |
| 2015/0120408 A1* | 4/2015 | Liu et al. .................. 705/14.12 |

FOREIGN PATENT DOCUMENTS

| | | |
|---|---|---|
| WO | 2013123122 | 1/2013 |
| WO | 2015003069 | 1/2015 |

* cited by examiner

SYSTEM AND METHOD FOR PROVIDING RECOMMENDATIONS FOR IN-GAME EVENTS

FIELD OF THE DISCLOSURE

This disclosure relates to systems and method for providing recommendations to users of a game based on the capabilities and specification of the client devices used to access the game.

BACKGROUND

Different classes of devices such as laptops, tablet computers, gaming consoles, smartphones, smart TVs and/or other classes of devices may have technical capabilities that are different from one another. For example, laptop computers may have different technical capabilities than smartphones, such as different processing and graphical display capabilities. Furthermore, different types of devices within a given class of device may have different capabilities from one another. For example, a particular model of smartphone may have different technical capabilities than another model of smartphone, such as different screen resolutions, processing capabilities and/or connectivity capabilities.

Different devices may have different input mechanisms, such as gesture controls, voice controls, touch controls (e.g., soft or mechanical buttons), joysticks, gamepads, and/or other input mechanism. The different input mechanisms may each have different characteristics that lends better to certain game activity or content than others.

Leveraging the differences in the capabilities of the devices for gameplay of a game may provide dynamic gaming experiences for users depending on the class and/or type of device used to access the game.

SUMMARY

One aspect of the disclosure relates to providing recommendations to users of a game based on the specification of the client device used by the users to access the game. Recommendations of content may be provided to users of a game based on the specification of the client device used by the users to access the game. Recommendations may be provided automatically to users of the game. For example, recommendations may be automatically provided by the system for providing recommendations to users of a game. Systems for providing recommendations of content to players of an online game may be configured to determine the specification sets of device a user is using to access the game. The system may be capable of obtaining and/or determining the minimum threshold requirements of sets of content and provide recommendations to users of in-game content to users based on the obtained and/or determined minimum threshold requirements of the sets of in-game content and the specification sets of the device a user is using to access the online game. The recommended content may include actions or activities within the game such as attacking an enemy, gathering troops, securing resources, performing research, training troops, playing certain game levels, attending virtual meetings, and/or other actions or activities. The recommended content may include virtual items usable in the game, virtual services that can be acquired/used, virtual locations that may be visited and/or purchased, and/or other content that is usable in the game. The recommended content may include content external to the game, such as websites, forums, other games, videos, chat rooms, e-commerce websites and/or applications, and/or other content external to the game.

The user may access the game using a client computing device having a touchscreen input system. Typing on touchscreen devices may not be as easy or convenient as a device having a physical keyboard. The system may present the user, using a touchscreen device, a recommendation for an activity or action that does not require extensive typing. When using such devices, the recommended activities presented to users may include those that can be easily controlled or otherwise interacted with using gestures on the touch screen or voice controls. On the other hand, the system may provide a player using a laptop computer to play the game with a recommendation related to activities or actions that are controlled or otherwise interacted with using typed commands.

Users using devices having greater processing capabilities may be presented with recommendations for activities or actions which have a higher degree of complicated gameplay or require better graphical capabilities compared to devices having less processing capabilities. Additionally, larger devices may have input devices or mechanisms that are better suited to using both of the user's hands when interacting with the game. The system may recommend to users of such devices activities and/or actions which are better suited to using two hands.

In some implementations, the system may include one or more servers. The server(s) may be configured to communicate with one or more client computing platforms according to a client/server architecture. The users may access the system and/or a virtual space (e.g., a virtual world, a game space, etc.) via the client computing platforms.

The server(s) and/or client computer platforms may be configured to execute one or more computer program components to provide recommendations to users. The computer program components may include one or more of a game component, a device specification determination component, a content recommendation component, and/or other components.

The game component may configured to execute an instance of a virtual space in which a game is conducted, and to implement the instance to facilitate presentation of a view of the virtual space to users through client computing devices associated with the users, users including a first user associated with a first client computing device. Such games may be an online game. The instance of the virtual space may be executed on a server in electrical connection with a client computing device, where a presentation of the virtual space is facilitated through the client computing devices. Users may use the client computing device to control actions within the virtual space. The client computing device may be electrically connected to the server through a network. The network may include one or more of a local area network, the internet, a wireless network, a wired network, and/or other networks.

In other examples, the game component may be configured to execute an instance of a virtual space in which a game is conducted, and to implement the instance to facilitate presentation of a view of the virtual space to users through the client computing devices associated with the users including a first user associated with a first client computing device.

A device specification determination component may be configured to obtain device specification sets of the client computing devices associated with the users, such that a first device specification set is determined for the first client computing device. Device specification sets may include information regarding the client computing device specifications. Such information may include processing ability, user input mechanisms, graphical display information, screen size, age, number of previous users, storage capacity, location, connectivity options and/or other information related to the client computing device.

The content recommendation component may be configured to determine recommendations in the game for the users based on the obtained device specification sets, and to effectuate communication of the recommendations to the users, such that the content recommendation component determines a first recommendation in the game for the first user based on the first device specification set, and to effectuate communication of the first recommendation to the first user. Such determination and communication of recommendations may occur automatically within the system.

The first recommendation may be an offer to interact with specific content in the game, purchase a virtual item, establish a relationship with one or more other users, and/or one or more other actions. The first recommendation may be an offer to participate in activities in the game suited to the interface of the first client computing device. The first recommendation may be an offer to participate in activities suited to the processing and/or storage capabilities of the first client computing device. The recommendation may be an invitation to participate in one or more event sets associated with the online game.

The first recommendation may be an offer to participate in activities suited to the input capabilities of the first client computing device. The input capabilities of the first client computing device may include one or more of a touchscreen, a keyboard, a joystick, a directional pointing device, a controller, a remote control, a gesture recognition device, a video input device, an audio input device, and/or any other input device. For example, where the input capabilities of the first client computing device include a touch screen, the first recommendation may be an offer to participate in activities suited to interactions by the first user through a touchscreen, such as an activity adapted to client computing devices that typically have touchscreen input devices and require the user to interact with the game through a swiping motion or touching a particular area of the screen. As another example, where the input capabilities of the first client computing device include a keyboard, the first recommendation may be an offer to participate in activities suited to interactions by the first user though a keyboard, such as online chatting and/or typing various commands.

The first recommendation may be an offer to purchase one or more virtual items having an associated cost to the user. The associated cost to the user may be related to the device specification sets of the client computing devices associated with the users, such that the associated cost to the user for the offer to purchase one or more virtual items is related to the one or more device specification sets of the client computing devices associated with the first user. For example, the device specification set associated with a client computing device associated with the first user may include information related to the propensity of the user to make in-game purchases, such as purchasing virtual items, using that given client computing device. Such a client computing device may have one or more input devices or communication devices making it easier to purchase items with it, such as a keyboard, access to the internet or some other specification. The client computing device may have stored information related to the users purchase mechanisms, such as credit card information, bank account information, online payment system information, and/or other payment information of the first user indicating a propensity to make purchases using the given client computing device.

The associated user cost of the in-game purchase may be based upon the device specification sets and may be modified based upon the device specification sets of the client computing devices associated with the first user. For example, the user component may include information related to the user's client computing devices. Users having more expensive client computing devices, or users having two or more client computing device which are used to access the online game may be more or less likely to make in-game purchases. Accordingly, the associated user cost of the in-game purchase may be increased, or decreased, in order to incentivize the user to make in-game purchases.

In other implementations, the user component may include a first user account wherein the first user account includes information related to the client computing devices associated with the user and used to access the online game. Upon an indication that the user has a higher propensity to make in-game purchases using a first client computing device associated with the user compared to other client computing devices associated with the user, the content recommendation component may be configured to determine recommendations for in-game content accessible by the first client computing device in order to increase the likelihood that the user will make an in-game purchase.

The device specification determination component may be further configured to determine a second device specification set for a second client computing device associated with the first user. In response to a determination of the second device specification set for a second client computing device, the content recommendation component may be further configured to determine a second recommendation in the game for the first user based on the second device specification set, and to effectuate communication of the second recommendation to the first user. Where there are first and second device specification sets for first and second client computing devices associated with the user, the first recommendation and the second recommendation may be an offer to participate in an activity suited to the specification sets for the first client device and the second client device, such that both the first client device and second client device may be used simultaneously and/or interchangeably by the user when participating in the activity.

Where there are two client computing devices associated with the first user, one of the client computing devices may be the main client computing device and the second client computing device may be an auxiliary client computing device. The main client computing device may have superior computing and/or graphical capabilities than the auxiliary client computing device. As such, the first recommendation for the first, or main, client computing device may be an activity which requires superior computing capabilities, for example, the main game play. The second recommendation for the second, or auxiliary, client computing device may be an activity which requires less computing capabilities, for example, a mini-game, map, chat room, message board and/or other activity associated with the main game play.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
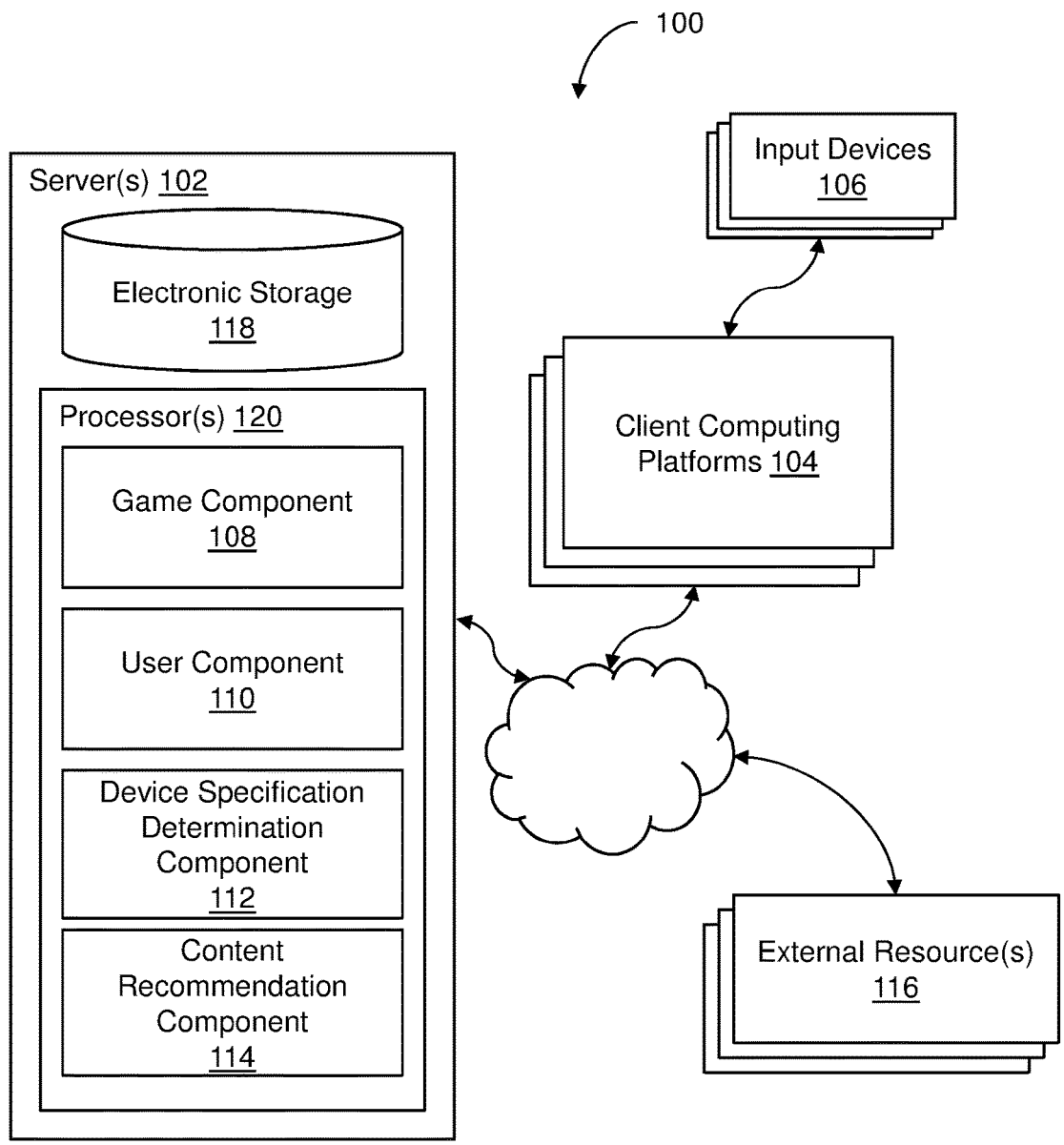
FIG. 1 illustrates a system configured to provide recommendations for in-game events to players of an online game, in accordance with one or more implementations.

Recommendations of content may be provided to users of a game based on the specification of the client device used by the users to access the game. Such recommendations may be provided to users automatically. Systems for providing recommendations of content to players of an online game may be configured to determine the specification sets of device a user is using to access the game. The system may be capable of obtaining and/or determining the minimum threshold requirements of sets of content and provide recommendations to users of in-game content to users based on the obtained and/or determined minimum threshold requirements of the sets of in-game content and the specification sets of the device a user is using to access the online game. The recommended content may include actions or activities within the game such as attacking an enemy, gathering troops, securing resources, performing research, training troops, playing certain game levels, attending virtual meetings, and/or other actions or activities. The recommended content may include virtual items usable in the game, virtual services that can be acquired/used, virtual locations that may be visited and/or purchased, and/or other content that is usable in the game. The recommended content may include content external to the game, such as websites, forums, other games, videos, chat rooms, e-commerce websites and/or applications, and/or other content external to the game.

The specification sets of the client computing devices may include information regarding the processing capacity, graphical processing capacity, screen size, screen dimension information, visual capability information, hard drive capacity, input device capabilities, connectivity capabilities, data input capabilities, a quantification of the ease of portability of the client computing device, and/or other feature information about the client computing devices. The specification sets of the client computing devices may also include information relating to the expense of the client computing device, the amount of purchases made by the user through the client computing device, information regarding browsing history or event history of the user through the client computing device, information regarding devices associated with the client computing device such as other client computing devices, information regarding other users utilizing the client computing device, and/or other information regarding the client computing device.

As an illustrative example of the system only, the user may access the online game using a client computing device having a touchscreen input system. Typing on touchscreen devices may not be as easy or convenient as doing so through a physical keyboard. The system may automatically, or otherwise, present the user, using a touchscreen device, a recommendation for an activity or action that does not require extensive typing. When using such devices, the recommended activities presented to users may include those that can be easily controlled or otherwise interacted with using gestures on the touch screen and/or voice controls. On the other hand, the system may provide a player using a laptop computer to play the game with a recommendation related to activities or actions that are controlled or otherwise interacted with using typed commands.

As another illustrative example of the system only, users using devices having greater processing capabilities may be automatically presented with recommendations for activities or actions which have a higher degree of complicated gameplay and/or require increased processing capabilities and/or increased graphical capabilities compared to devices having less processing capabilities. Additionally, larger devices may have input devices or mechanisms that are better suited to using both of the user's hands when interacting with the game as opposed to small devices suited to receiving inputs from the use of only one hand and/or finger(s) of the user. The system may recommend to users of larger devices activities and/or actions which are better suited to using two hands, and may recommend to users of smaller devices activities and/or actions which are better suited to using only one hand and/or finger(s).

FIG. 1 illustrates a system 100 for providing in-game content to players of an online game. The system 100 may be configured to determine the specification(s) of the client computing device 104 used by users of the online game to access the game. The system 100 may be configured to provide an online space to users to participate within the online game. Providing the virtual space may include hosting the virtual space over a network. In some implementations, system 100 may include a server(s) 102. The server 102 may be configured to communicate with one or more client computing platforms 104 according to a client/server architecture. The users may access system 100 and/or the virtual space via client computing platforms 104.

In some implementations, system 100 may include one or more of one or more virtual space servers 102, one or more system servers (not shown), and/or other components. The virtual space server 12 may be configured to communicate with one or more client computing platforms 104 according to a client/server architecture to provide the virtual [environment/space] to users via the client computing platforms 104. The system server (not shown) may be configured to interface with virtual space server 102 to supplement the functionality provided to the users with respect to the virtual space. For example, system server (not shown) may interface with virtual server 12 via one or more application programming interfaces.

The server(s) 102 may be configured to execute one or more computer program components. The computer program components may include one or more of a game component 108, a user component 110, and device specification determination component 112, a content recommendation component 114, and/or other components.

The user component 110 may be configured to access and/or manage one or more user profiles and/or user information associated with users of the system 100. The one or more user profiles and/or user information may include information stored by server(s) 102, one or more of the client computing platforms 104, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

The user profiles and/or user information associated with users of the system 100 may include information related to the client computing devices associated with users. Users may provide an indication of the client computing devices owned and/or operated by the users to the system 100. The system 100 may be configured to obtain identifying information related to the client computing devices associated with the users when, for example, the user uses his or her associated computing devices to access the online game through the system 100. The user profiles and/or user information associated with the users of the system may include information related to content preferences of the user. The system 100 may be configured to obtain content preference information for users based on user inputs. The system 100 may be configured to obtain content preference information for users based on historical user of the system 100 by the user, use of the client computing device generally by the user, and/or from other sources of information regarding the user's online and/or gaming behavior.

The game component 108 may be configured to execute an instance of a virtual space in which an online game is conducted, and to implement the instance to facilitate presentation of a view of the virtual space to users through one or more client computing devices 104 associated with the users, users including a first user associated with a first client computing device 104.

The game component 108 may be configured to implement the instance of the virtual space executed by the computer components to determine the state of the virtual space. The state may then be communicated (e.g., via streaming visual data, via object/position data, and/or other state information) from server 102 to client computing platforms 104 for presentation to users. The state determined and transmitted to a given client computing platform 104 may correspond to a view for a user character being controlled by a user via the given client computing platform 104. The state determined and transmitted to a given client computing platform 104 may correspond to a location in the virtual space. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the virtual space may comprise a simulated space that is accessible by users via clients (e.g., client computing platforms 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The above description of the manner in which state of the virtual space is determined by game component 108 is not intended to be limiting. The game component 108 may be configured to express the virtual space in a more limited, or more rich, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by game component 108, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 104. The users may interact with each other through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server(s) 102 (e.g., through game component 108).

Interactive, electronic social media may include one or more of a social network, a virtual space, a micro-blogging service, a blog service (or host), a browser-based game, a multi-player mobile game, a file (e.g., image file, video file, and/or other files) sharing service, a messaging service, a message board, a forum, and/or other electronically distributed media that are scalable and enable interaction between the users. Some non-limiting specific examples of interactive, electronic social media may include the micro-blogging service provided by Twitter™, the social network provided by Facebook™, the social network provided by MySpace™, the social network provided by Foursquare®, the virtual world provided by SecondLife®, the massively multi-player online game provided by World of Warcraft®, the file sharing service provided by Flickr®, Blogger, YouTube, PlayStation® Home, Xbox® Live, and/or other interactive electronic social media.

As recited above, the game component 108 may be configured to execute an instance of a virtual space in which a game is conducted, and to implement the instance to facilitate presentation of a view of the virtual space to users through client computing devices 104 associated with the users, users including a first user associated with a first client computing device 104. Such games may be an online game. The instance of the virtual space may be executed on a server 102 in electrical connection with a client computing device 104, where a presentation of the virtual space is facilitated through the client computing devices 104. Users may use the client computing device 104 to control actions within the virtual space. The client computing device 104 may be electrically connected to the server 102 through a network. The network may include one or more of a local area network, the internet, a wireless network, a wired network, and/or other networks.

In other examples, the game component 108 may be configured to execute an instance of a virtual space in which a game is conducted, and to implement the instance to facilitate presentation of a view of the virtual space to users through the client computing devices 104 associated with the users including a first user associated with a first client computing device.

A device specification determination component 110 may be configured to obtain device specification sets of the client computing devices 104 associated with the users, such that a first device specification set is determined for the first client computing device 104. Device specification sets may include information regarding the client computing device specifications. Such information may include processing ability, user input mechanisms 106, graphical display information, screen size, age, number of previous users, storage capacity, location, connectivity options and/or other information related to the client computing device 104.

The content recommendation component 114 may be configured to determine recommendations in the game for the users based on the obtained device specification sets, and to effectuate communication of the recommendations to the users, such that the content recommendation component 114 determines a first recommendation in the game for the first user based on the first device specification set, and to effectuate communication of the first recommendation to the first user. Determination and communication of such recommendations may be automatic, such that, based on the obtained device specification sets, the content recommendation component 114 may be configured to automatically determine recommendations in the game for users, and to automatically effectuate communication of the recommendations to the users.

Figure 2:
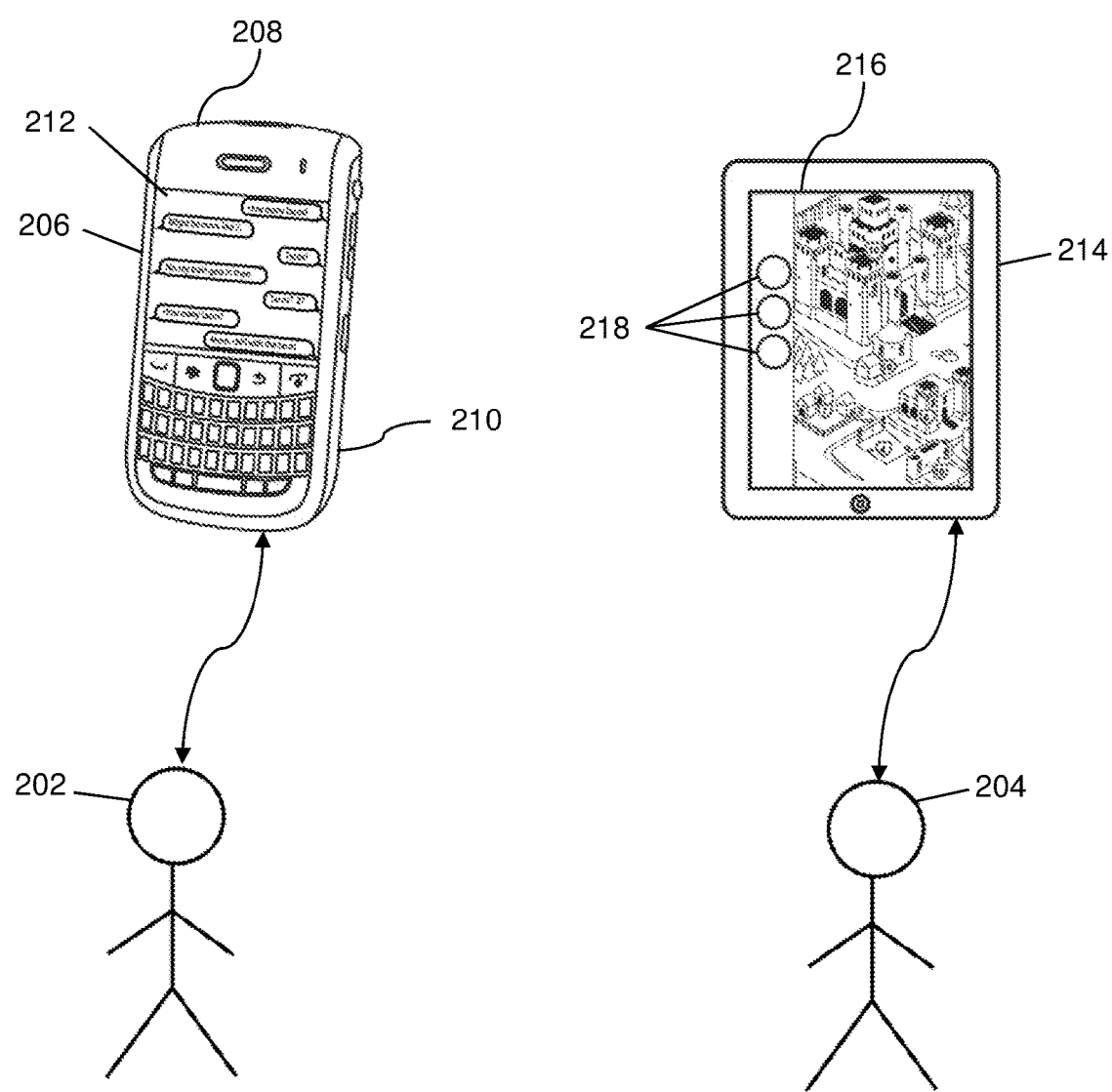
FIG. 2 schematically illustrates a user interacting with the system of FIG. 1, in accordance with one or more implementations.

FIG. 2 schematically illustrates a first user 202 and a second user 204 interacting with the system 100 of FIG. 1, in accordance with one or more implementations. A first client computing device 206 may be associated with the first user 202. The first client computing device 206 may have a screen 208 and a keyboard 210. The screen 208 may be configured to facilitate presentation of the virtual space 212 implemented by the game component 108 of FIG. 1. The device specification determination component 110 of FIG. 1 may be configured to obtain a first device specification set of the first client computing device 206 associated with the first user 202. The first device specification set may include information regarding the first client computing device 206 such as the input device of the first client computing device 206 is a keyboard 210. The first device specification set may also include information regarding the specification of the screen 208, such as its dimensions, its resolution, its color display capabilities, its frame-rate capabilities, and/or other information regarding the screen 208. The first device specification set may also include information regarding the processing capabilities of the first client computing device 206.

The content recommendation component 114 may be configured to automatically determine a first recommendation in the game for one or more first event sets to recommend to the first user 202 based on the obtained first device specification set of the first client computing device 206. The content recommendation component 114 may be configured to automatically effectuate communication of the recommendations to the first user 202. The recommended event sets may include an activity where the first user 202 interacts with the game, another game, external online content, and/or other content, through the first client computing device 206. Based on the first device specification set containing information regarding the screen 208, input device 210, processing capabilities, and/or other features of the first client computing device, the content recommendation component 114 may determine recommendations suited for the first client computing device 206. For example, as shown in FIG. 2, the first client computing device 206 comprises a relatively small screen 208 and a keyboard 210. Recommendations, as determined by the content recommendation component 114 may include content suitable for a smaller screen and keyboard-type input device. For example, the content recommendation component 114 may recommend to the first user 202 text-based activities, such as text-based communication with other users of the game and/or non-player characters of the game, to play using the first client computing device 206.

A second client computing device 214 may be associated with the second user 204 of the system 100, of FIG. 1. The second client computing device may comprise a touchscreen 216. The device specification determination component 112 may be configured to determine a second device specification set relating to the second client computing device 214. The second device specification set may include information regarding the second client computing device 214 such as information regarding the input device of the second client computing device 214, the size, dimensions, and capabilities of the screen 216 of the second client device 214, and/or other information about the capabilities and/or features of the second client device 214. The second device specification set may also include information regarding the processing capabilities of the second client computing device 214.

The content recommendation component 114 may be configured to automatically determine a second recommendation in the game for one or more second event sets to recommend to the second user 204 based on the obtained second device specification set of the second client computing device 214. The content recommendation component 114 may be configured to automatically effectuate communication of the recommendations to the second user 204. The one or more second event sets may be event sets suitable for the second client computing device 214. For example, as shown in FIG. 2, the second client computing device 214 may comprise of a relatively large touchscreen 216. The one or more second event sets may include one or more activities suitable for interaction, by the second user 204, through a touchscreen 216, such as selecting areas 218 to interact with the touchscreen 216 to select an object in the virtual space presented through the touchscreen 216, or effectuate movement of a character or view on the touchscreen 216, or equip a character with different armaments, defenses, clothing, and/or other attributes. The one or more second event sets may include activities requiring processing capabilities suitable for the second client computing device 214. For example, the processing capabilities of the second client computing device 214 may be greater than the processing capabilities of the first client computing device 206. The one or more first event sets recommended to the first user 202 may, therefore, require less processing power than the one or more second event sets recommended to the second user 204, based on the respective first and second device specification sets of the first and second client computing devices 206, 214.

The first recommendation may be an offer to interact with specific content in the game, purchase a virtual item, establish a relationship with one or more other users, and/or one or more other actions. The first recommendation may be an offer to participate in activities in the game suited to the interface of the first client computing device. The first recommendation may be an offer to participate in activities suited to the processing and/or storage capabilities of the first client computing device.

The first recommendation may be an offer to participate in activities suited to the input capabilities of the input device 106 of the first client computing device 104. The input capabilities 106 of the first client computing device 104 may include one or more of a touchscreen, a keyboard, a joystick, a directional pointing device, a controller, a remote control, a gesture recognition device, a video input device, an audio input device, and/or any other input device. The input device may be connected to the client communication platform through one or more electronic connections, including wired and wireless connections. Where the input capabilities 106 of the first client computing device 104 include a touch screen, the first recommendation may be an offer to participate in activities suited to interactions by the first user through a touchscreen, such as an activity adapted to client computing devices that typically have touchscreen input devices 104 and require the user to interact with the game through a swiping motion or touching a particular area of the screen. As another example, where the input capabilities 106 of the first client computing device 104 include a keyboard, the first recommendation may be an offer to participate in activities suited to interactions by the first user though a keyboard, such as online chatting and/or typing various commands.

Users may receive the recommendation of the one or more event sets through the implementation of the virtual space presented by the client computing devices associated with the users. Such recommendation may be displayed as a pop-up message, in a message pane of the interface associated with the online game, or a notification provided in an in-game mailbox, and/or other in-game notification methods. Recommendations may be provided externally from the game such as in the form of electronic mail, SMS messaging, instant messaging, social media posts and/or messages, viral messages, online video, postal services, and/or other notification methods.

Figure 3:
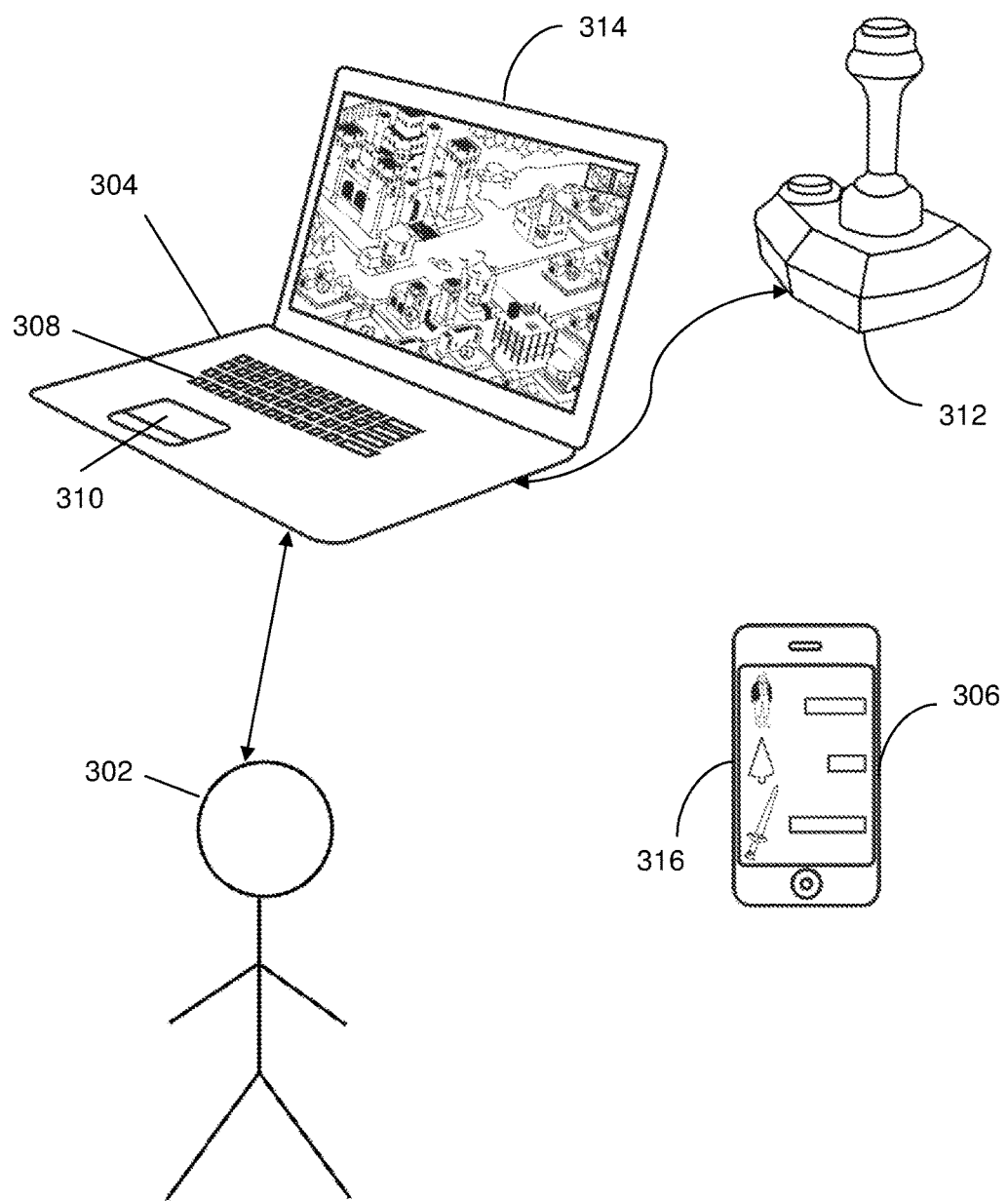
FIG. 3 schematically illustrates users interacting with the system of FIG. 1, in accordance with one or more implementations.

As shown in FIG. 3, the first user 302 may be associated with multiple client computing devices 304, 306. The device specification determination component 112 may be configured to determine a first device specification set for the first client computing device 304 associated with the first user 302 and determine a second device specification set for the second client computing device 306 associated with the first user 302.

The content recommendation component 114 may be configured to determine recommendations in the game for one or more first event sets to recommend to the first user 302 based on the obtained first device specification set of the first client computing device 304 and to determine recommendations in the game for one or more second event sets to recommend to the first user 302 based on the obtained second device specification set of the second client computing device 306. In some embodiments, the one or more second event sets may be related to the one or more first event sets, such that the one or more second event sets compliment or augment the one or more first event sets. The content recommendation component 114 may provide recommendations in the game for one or more first and second event sets to the first user 302. Such recommendations may be determined and communicated automatically by the system 100 through the one or more client computing devices 104.

The one or more first event sets may be determined based on their suitability for being interacted with, by the first user 302, through the first client computing device 304. Similarly, the one or more second event sets may be determined based on their suitability for being interacted with, by the first user 302, through the second client computing device 306. The first client computing device 304 and the second client computing device 306 may be used interchangeably, simultaneously, or alternatively to interact with the online game. In some embodiments, the first client computing device 304 may have a first specification set indicating that it is capable of running a main game provided by system 100 of FIG. 1. The second client computing device 306 may have a second specification set indicating that it is capable of running only a sub-set of the main game provided by system 100 of FIG. 1. As such, the first client computing device 304 may be the main computing device capable of hosting an implementation of the online game, and the second client computing device 306 may be an auxiliary client computing device capable of hosting a portion of the online game, such as a map, character information, chat interface, or other portion of the online game.

The main client computing device 304 may have superior computing and/or graphical capabilities than the auxiliary client computing device 306. For example, the screen 314 of the main client computing device 304 may be larger than the screen 316 of the auxiliary client computing device 306. As such, the first recommendation for the first, or main, client computing device 304 may be for one or more first event sets which require superior computing capabilities and/or graphical capabilities compared the one or more second event sets, for example, the main game play of the online game provided by system 100. The second recommendation for the second, or auxiliary, client computing device 306 of one or more second event sets may be an activity which may require less computing capabilities and or graphical capabilities than the one or more first event sets, for example, a mini-game, map, chat room, message board and/or other activity associated with the main game play. Additionally, the auxiliary client computing device 306 may include a touch screen input device 316. The second recommendation for the second, or auxiliary client computing device 306 may be an activity which is suited to interaction by the user through a touch screen input device 316.

The main client computing device 304 may have superior user input devices, such as a physical keyboard 308, mouse 310, or joystick 312. The device specification sets determined for the main client computing device 304 may include an indication that the client computing device 304 includes a keyboard 308, mouse 310 and a joystick 312. Based on the device specification set for the main client computing device 304, the content recommendation component 114 may provide a first recommendation in the game for the first user that includes content suited to interaction with a keyboard 308, mouse 310 and/or joystick 312.

The server(s) 102, client computing platforms 104, and/or external resources 116 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, and/or external resources 116 may be operatively linked via some other communication media.

A given client computing platform 104 may include one or more processors configured to execute computer program components. The computer program components may be configured to enable an expert or user associated with the given client computing platform 104 to interface with system 100 and/or external resources 116, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

The external resources 116 may include sources of information, hosts and/or providers of virtual environments outside of system 100, external entities participating with system 100, and/or other resources. In some implementations, some or all of the functionality attributed herein to external resources 116 may be provided by resources included in system 100.

The server(s) 102 may include electronic storage 118, one or more processors 120, and/or other components. The server 102 may include communication lines, or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 118 may comprise electronic storage media that electronically stores information. The electronic storage media of electronic storage 118 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 118 may include one or more virtual storage resources (e.g., cloud storage, a virtual private network, and/or other virtual storage resources). Electronic storage 118 may store software algorithms, information determined by processor 120, information received from server 102, information received from client computing platforms 104, and/or other information that enables server 102 to function as described herein.

Processor(s) 120 is configured to provide information processing capabilities in server 102. As such, processor 118 may include one or more of a digital processor, an analog processor, a digital circuit designed to process information, an analog circuit designed to process information, a state machine, and/or other mechanisms for electronically processing information. Although processor 120 is shown in FIG. 1 as a single entity, this is for illustrative purposes only. In some implementations, processor 120 may include a plurality of processing units. These processing units may be physically located within the same device, or processor 120 may represent processing functionality of a plurality of devices operating in coordination. The processor 120 may be configured to execute components 108, 110, 112, 114 and/or other components. Processor 120 may be configured to execute components 108, 110, 112, 114 and/or other components by software; hardware; firmware; some combination of software, hardware, and/or firmware; and/or other mechanisms for configuring processing capabilities on processor 120.

It should be appreciated that although components 108, 110, 112, 114 are illustrated in FIG. 1 as being co-located within a single processing unit, in implementations in which processor 120 includes multiple processing units, one or more of components 108, 110, 112, 114 and/or other components may be located remotely from the other components. The description of the functionality provided by the different components 108, 110, 112, 114 and/or other components described below is for illustrative purposes, and is not intended to be limiting, as any of components 108, 110, 112, 114 and/or other components may provide more or less functionality than is described. For example, one or more of components 108, 110, 112, 114 and/or other components may be eliminated, and some or all of its functionality may be provided by other ones of components 108, 110, 112, 114 and/or other components. As another example, processor 120 may be configured to execute one or more additional components that may perform some or all of the functionality attributed below to one of components 108, 110, 112, 114 and/or other components.

Figure 4:
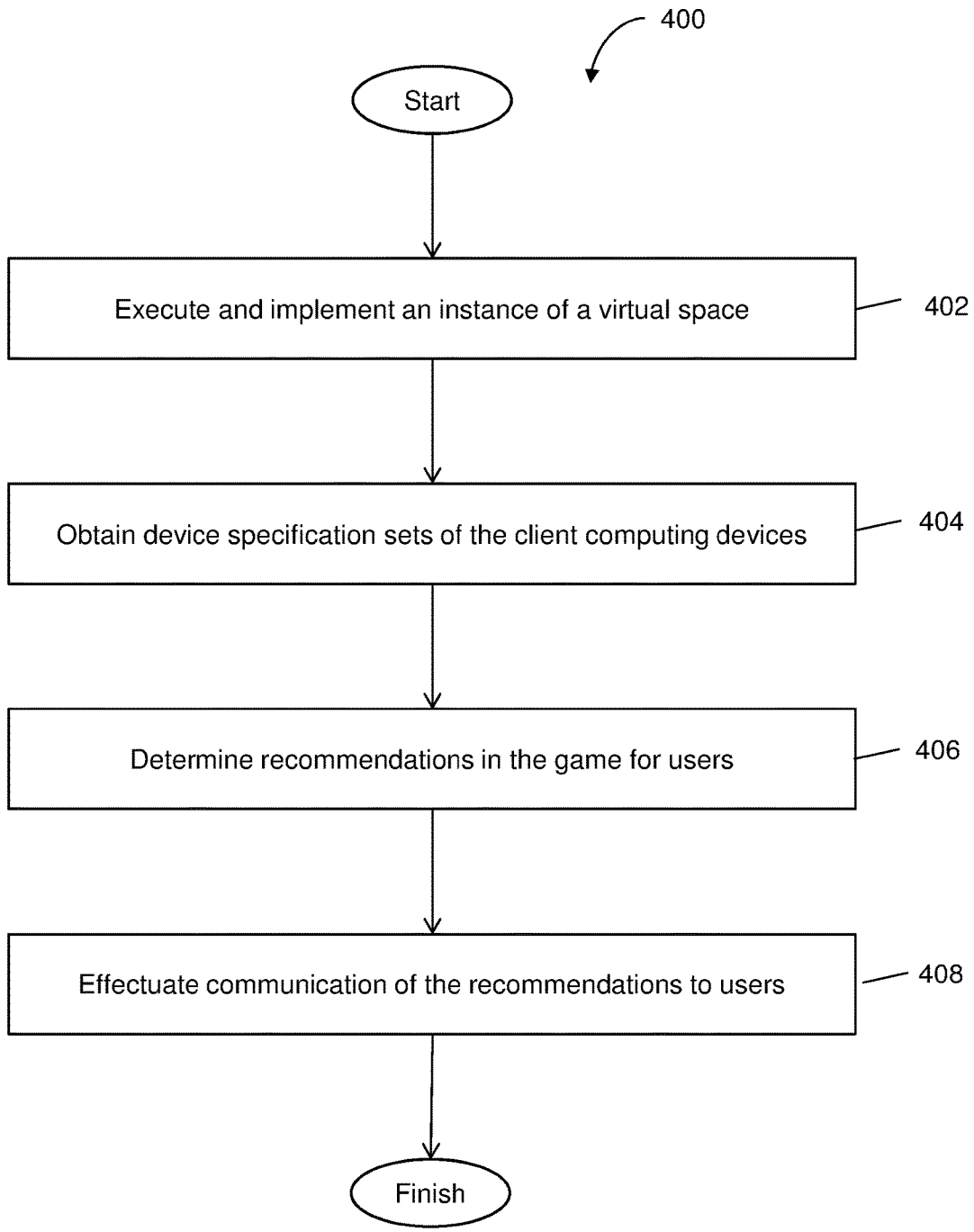
FIG. 4 illustrates a method for providing recommendations for in-game events to players of an online game.

FIG. 4 illustrates a method 400 of providing recommendations for in-game events to players of an online game. The method 400 may implemented on a computer system that includes one or more physical processors. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At an operation 402, an instance of a virtual space may be executed and implemented. An online game may be conducted in the instance of the virtual space. The instance may be implemented in order to facilitate presentation of a view of the virtual space to users through client computing devices 104 associated with the users, users including a first user associated with a first client computing device 104. Operation 402 may be performed by a game component that is the same as or similar to game component 108, in accordance with one or more implementations.

At an operation 404, device specification sets of the client computing devices 104 associated with the users may be obtained, such that a first device specification set is determined for the first client computing device 104. Operation 404 may be performed by a device specification determination component that is the same as or similar to device specification determination component 112, in accordance with one or more implementations.

At an operation 406, recommendations in the game for the users based on the obtained device specification sets may be determined. Such determination may be automatic. Operation 406 may be performed by a content recommendation component that is the same as or similar to content recommendation component 114, in accordance with one or more implementations.

At an operation 408, communication of the recommendations may be effectuated to the users, such that a first recommendation in the game for the first user may be determined based on the first device specification set, and communication of the first recommendation to the first user is effectuated. Such communication may be automatically effectuated. Operation 408 may be performed by a content recommendation component that is the same as or similar to content recommendation component 114, in accordance with one or more implementations.

Examples of the first recommendation may include one or more of the following: an offer to interact with specific content in the game, purchase a virtual item, establish a relationship with one or more other users, and/or one or more other actions; an offer to participate in activities in the game suited to the interface of the first client computing device; or, an offer to participate in activities suited to the processing and/or storage capabilities of the first client computing device. The offers and recommendations herein described are not inclusive and are intended to be illustrative only. One of ordinary skill in the art would appreciate and understand that the first recommendation may include any number of types of different offers.

At an operation 404 a second device specification set may be determined for a second client computing device associated with the first user. At an operation 406 a second recommendation in the game may be determined for the first user based on the second device specification set. At an operation 408 communication of the second recommendation to the first user may be effectuated. The first recommendation and the second recommendation may be an offer to participate in an activity suited to the specification sets for the first client device 304 and the second client device 306, such that both the first client device 304 and second client device 306 may be used simultaneously and/or interchangeably when participating in the activity.

The first recommendation may be an offer to participate in activities suited to the input capabilities of the first client computing device 104. The input capabilities of the first client computing device 104 may include a touch screen, such that the first recommendation is an offer to participate in activities suited to interactions by the first user through a touchscreen. The first recommendation may be an offer to purchase one or more virtual items having an associated cost to the user. The associated cost to the user may be related to the device specification sets of the client computing devices 104 associated with the users, such that the associated cost to the user for the offer to purchase one or more virtual items is related to the device specification set of the client computing device 104 associated with the first user.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system to provide recommendations for in-game content to users of an online game, the system comprising:
    one or more processors configured by machine-readable instructions to:
        execute an instance of a virtual space in which the online game is conducted, and to use the instance to generate state information that is transmitted over a network to client computing platforms associated with the users, wherein the transmission of the state information over the network facilitates presentation of a view of the virtual space to the users through the client computing devices associated with the users, the users including a first user associated with a first client computing device;
        obtain device specification information for the client computing devices associated with the users, such that first device specification information is obtained for the first client computing device; and
        determine recommendations in the online game for the users based on the device specification information obtained, and to effectuate communication of the recommendations to the users, such that a first recommendation in the online game is determined for the first user based on the first device specification information, and to effectuate communication of the first recommendation to the first user.

2. The system of claim 1, wherein the first recommendation is an offer to interact with specific content in the online game, purchase a virtual item, establish a relationship with one or more other users, and/or one or more other actions.

3. The system of claim 1, wherein the first recommendation is an offer to participate in activities in the online game suited to the interface of the first client computing device.

4. The system of claim 1, wherein the first recommendation is an offer to participate in activities suited to the processing and/or storage capabilities of the first client computing device.

5. The system of claim 1, wherein the one or more processors are further configured by machine-readable instructions to:
obtain second device specification information for a second client computing device associated with the first user; and
determine a second recommendation in the online game for the first user based on the second device specification information, and to effectuate communication of the second recommendation to the first user.

6. The system of claim 5, wherein the first recommendation and the second recommendation include one or more offers to participate in an activity suited to the device specification information for the first client device and the second client device, such that both the first client device and second client device may be used simultaneously and/or interchangeably when participating in the activity.

7. The system of claim 1, wherein the first recommendation is an offer to participate in activities suited to the input capabilities of the first client computing device.

8. The system of claim 7, wherein the input capabilities of the first client computing device include a touch screen, such that the first recommendation is the offer to participate in activities suited to interactions by the first user through a touchscreen.

9. The system of claim 1, wherein the first recommendation is an offer to purchase one or more virtual items having an associated cost to the first user.

10. The system of claim 9, wherein the associated cost to the first user is related to the device specification information for the client computing devices associated with the users, such that the associated cost to the first user for the offer to purchase one or more virtual items is related to the device specification information for the client computing device associated with the first user.

11. A method for providing recommendations for in-game events to users of an online game, the method being implemented on a computer system that includes one or more physical processors configured by machine-readable instructions, the method comprising:
executing an instance of a virtual space in which the online game is conducted, and to use the instance to generate state information that is transmitted over a network to client computing platforms associated with the users, wherein the transmission of the state information over the network facilitates presentation of a view of the virtual space to the users through the client computing devices associated with the users, the users including a first user associated with a first client computing device;
obtaining device specification information for the client computing devices associated with the users, such that first device specification information is obtained for the first client computing device; and
determining recommendations in the online game for the users based on the device specification information obtained, and to effectuate communication of the recommendations to the users, such that a first recommendation in the online game for the first user is determined based on the first device specification information, and to effectuate communication of the first recommendation to the first user.

12. The method of claim 11, wherein the first recommendation is an offer to interact with specific content in the online game, purchase a virtual item, establish a relationship with one or more other users, and/or one or more other actions.

13. The method of claim 11, wherein the first recommendation is an offer to participate in activities in the online game suited to the interface of the first client computing device.

14. The method of claim 11, wherein the first recommendation is an offer to participate in activities suited to the processing and/or storage capabilities of the first client computing device.

15. The method of claim 11, further comprising:
obtaining second device specification information for a second client computing device associated with the first user;
determining a second recommendation in the online game for the first user based on the second device specification information; and,
effectuating communication of the second recommendation to the first user.

16. The method of claim 15, wherein the first recommendation and the second recommendation include one or more offers to participate in an activity suited to the device specification information for the first client device and the second client device, such that both the first client device and second client device may be used simultaneously and/or interchangeably when participating in the activity.

17. The method of claim 11, wherein the first recommendation is an offer to participate in activities suited to the input capabilities of the first client computing device.

18. The method of claim 17, wherein the input capabilities of the first client computing device include a touch screen, such that the first recommendation is the offer to participate in activities suited to interactions by the first user through a touchscreen.

19. The method of claim 1, wherein the first recommendation is an offer to purchase one or more virtual items having an associated cost to the first user.

20. The method of claim 19, wherein the associated cost to the first user is related to the device specification information for the client computing devices associated with the users, such that the associated cost to the first user for the offer to purchase one or more virtual items is related to the device specification information for the client computing device associated with the first user.

* * * * *